United States Patent
Abusnaina et al.

(10) Patent No.: US 12,380,208 B2
(45) Date of Patent: Aug. 5, 2025

(54) MALWARE DETECTION AND MITIGATION SYSTEM AND METHOD THEREFOR

(71) Applicant: Visa International Service Association, San Francisco, CA (US)

(72) Inventors: Ahmed Abusnaina, Oviedo, FL (US); Yizhen Wang, Santa Clara, CA (US); Sunpreet Singh Arora, Union City, CA (US); Ke Wang, Sunnyvale, CA (US); Mihai Christodorescu, San Carlos, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/692,882

(22) Filed: Mar. 11, 2022

(65) Prior Publication Data

US 2023/0289441 A1 Sep. 14, 2023

(51) Int. Cl.
G06F 21/56 (2013.01)

(52) U.S. Cl.
CPC ...... *G06F 21/562* (2013.01); *G06F 2221/033* (2013.01)

(58) Field of Classification Search
CPC .................. G06F 21/562; G06F 2221/033
See application file for complete search history.

(56) References Cited

U.S. PATENT DOCUMENTS

| 2005/0223238 A1* | 10/2005 | Schmid | H04L 9/0625 713/188 |
| 2008/0028474 A1* | 1/2008 | Horne | H04L 9/3226 726/27 |

(Continued)

FOREIGN PATENT DOCUMENTS

WO WO-2017197519 A1 * 11/2017 ......... G06F 16/9024

OTHER PUBLICATIONS

Haipeng Cai, Na Meng, Barbara Ryder, Daphne Yao, Droidcat: Effective android malware detection and categorization via app-level profiling, IEEE Transactions on Information Forensics and Security, Jun. 2019,pp. 1455-1470, vol. 14, No. 6.

(Continued)

*Primary Examiner* — Rupal Dharia
*Assistant Examiner* — Devin E Almeida
(74) *Attorney, Agent, or Firm* — Buckley Patent Law LLC; Timothy Emmanuel Buckley

(57) ABSTRACT

In some embodiments, a malware detection system includes an attack channel removal unit, a feature extraction unit coupled to the attack channel removal unit, and a graphical encoding unit coupled to the feature extraction unit and a malware detection unit. In some embodiments, based upon graphically-encoded component-based features and monotonic features extracted from attack-channel-free software output by the attack channel removal unit, the malware detection unit detects malware in software input into the malware detection system. In some embodiments, the monotonic features extracted from the attack-channel free software and the graphically-encoded component-based features are combined to generate a combination monotonic-component based feature vector. In some embodiments, the combination monotonic-component based feature vector is used to detect malware using the malware detection system.

17 Claims, 5 Drawing Sheets

(56) References Cited

U.S. PATENT DOCUMENTS

| | | | |
|---|---|---|---|
| 2011/0145920 A1* | 6/2011 | Mahaffey | H04W 12/12 |
| | | | 726/22 |
| 2013/0326288 A1* | 12/2013 | Datta | G06F 12/1441 |
| | | | 714/48 |
| 2017/0098074 A1 | 4/2017 | Okano et al. | |
| 2018/0121659 A1* | 5/2018 | Sawhney | G06F 21/566 |
| 2019/0065746 A1 | 2/2019 | Alsulami et al. | |
| 2019/0102547 A1* | 4/2019 | Aktas | G06F 21/56 |
| 2020/0026851 A1* | 1/2020 | Dhankha | G06F 21/554 |
| 2020/0244687 A1* | 7/2020 | Trees | H04L 63/20 |
| 2020/0364338 A1 | 11/2020 | Ducau et al. | |
| 2023/0126708 A1* | 4/2023 | Wadhwa | G06Q 20/4016 |
| | | | 705/44 |

OTHER PUBLICATIONS

Luca Demetrio, Battista Biggio, Giovanni Lagorio, Fabio Roli, Alessandro Armando, Functionality-preserving black-box optimization of adversarial windows malware. IEEE Trans. Inf. Forensics Secur., 2021, pp. 3469-3478, vol. 16.

Luca Demetrio, Scott E. Coulli, Battista Biggio, Giovanni Lagorio, Alessandro Armando, and Fabio Roli, Adversarial EXEmples: A survey and experimental evaluation of practical attacks on machine learning for windows malware detection, ACM Transactions on Privacy and Security, Nov. 2021, pp. 1-31, vol. 24, Issue 4.

Inigo Incer, Michael Theodorides, Sadia Afroz, David A. Wagner, Adversarially robust malware detection using monotonic classification, Proceedings of the Fourth ACM International Workshop on Security and Privacy Analytics, IWSPA@CODASPY 2018, Mar. 19-21, 2018, pp. 54-63, ACM.

Alex Kantchelian, Sadia Afroz, Ling Huang, Aylin Caliskan Islam, Brad Miller, Michael Carl Tschantz, Rachel Greenstadt, Anthony D Joseph, JD Tygar, Approaches to adversarial drift, in Proceedings of the 2013 ACM workshop on Artifcial intelligence and security, 2013, pp. 99-110.

Bojan Kolosnjaji, Ambra Demontis, Battista Biggio, Davide Maiorca, Giorgio Giacinto, Claudia Eckert, Fabio Roli, Adversarial malware binaries: Evading deep learning for malware detection in executables, in Proceedings of the 26th European Signal Processing Conference, EUSIPCO, 2018, pp. 533-537.

Octavian Suciu, Scott E. Coull, Jerey Johns, Exploring adversarial examples in malware detection, in 2019 IEEE Security and Privacy Workshops, SP Workshops 2019, May 19-23, 2019, pp. 8-14, IEEE, San Francisco, CA, USA.

Zhaoqi Zhang, Panpan Qi, Wei Wang, Dynamic malware analysis with feature engineering and feature learning, in the AAAI Conference on Artificial Intelligence, AAAI, 2020, pp. 1210-1217, AAAI Press.

* cited by examiner

MALWARE DETECTION AND MITIGATION SYSTEM AND METHOD THEREFOR

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the number of financial transactions occurring on mobile devices ever increasing, the software applications utilized to perform the financial transactions on the mobile devices are falling prey to an increased number of malware and computer virus attacks. The malware and viral attacks compromise the integrity of the mobile devices and applications and put user sensitive data and secure transactions at risk. Traditionally, malware detection techniques that limit the effectiveness of the malware and computer viruses on the mobile devices have employed signature and heuristics-based approaches to detect malware. However, the effectiveness of these techniques, while largely efficient across malware families with similar characteristics, decreases significantly when encountering mutating malware.

DETAILED DESCRIPTION

Figure 1:
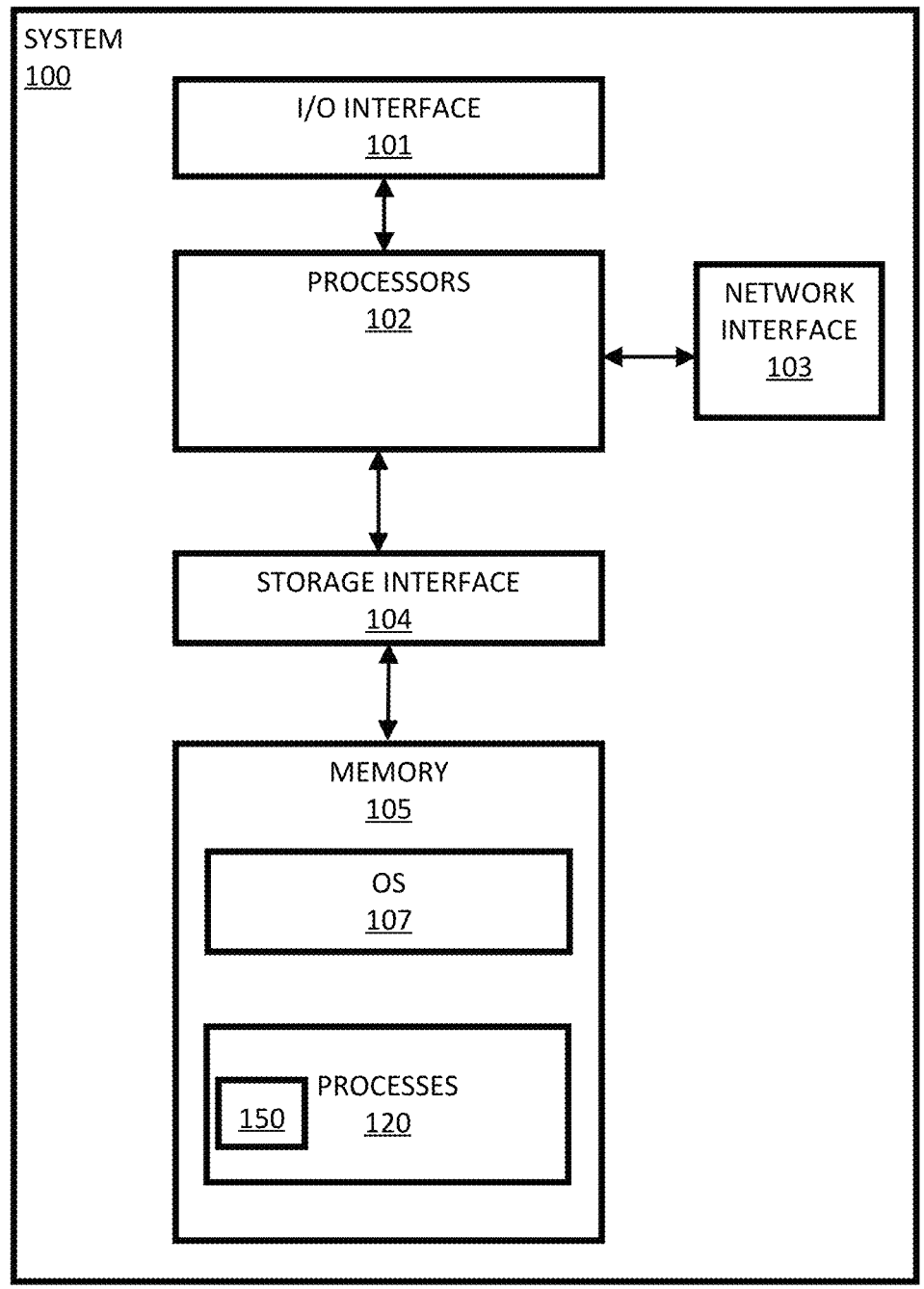
FIG. 1 illustrates a block diagram of a system in accordance with some embodiments.

FIG. 1 illustrates a block diagram of an exemplary system 100 for implementing embodiments consistent with the present disclosure. In some nonlimiting embodiments or aspects, the system 100 may utilize a malware detection and mitigation system 150 to implement a method for detecting and mitigating the effects of malware in a processing system. In some embodiments, the processor 102 may comprise at least one data processor for executing program components for dynamic resource allocation at run time. The processor 102 may include specialized processing units such as integrated system (bus) controllers, memory management control units, floating point units, graphics processing units, digital signal processing units, etc.

In some embodiments, the processors 102 may be disposed in communication with one or more input/output (I/O) devices (not shown) via an I/O interface 101. The I/O interface 101 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMi), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

In some embodiments, using the I/O interface 101, the system 100 may communicate with one or more I/O devices. For example, an input device 110 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device 111 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processors 102 may be disposed in communication with the communication network 109 via a network interface 103. The network interface 103 may communicate with the communication network 109. The network interface 103 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 109 may include, without limitation, a direct interconnection, e-commerce network, a peer to peer (P2P) network, local area network (LAN), wide area network (WAN), wireless network (e.g., using Wireless Application Protocol), the internet, Wi-Fi®, etc. Using the network interface 103) and the communication network 109, the system 100 may communicate with the one or more service operators.

In some non-limiting embodiments or aspects, the processors 102 may be disposed in communication with a memory 105 (e.g., RAM, ROM, etc. not shown in FIG. 1 via a storage interface 104. In some embodiments, the storage interface 104 may connect to memory 105 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

In some embodiments, the memory 105 may store a collection of program or database components, including, without limitation, a user interface 106, an operating system 107, a web server 108, etc. In some non-limiting embodiments or aspects, the system 100 may store user/application data, such as the data, variables, records, etc. as described in this disclosure. Such databases may be implemented as fault-tolerant, relational, scalable, secure databases such as Oracle or Sybase.

In some embodiments, the operating system 107 may facilitate resource management and operation of the system 100. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, etc.), APPLE® OS®, GOOGLE™ ANDROID™, BLACKBERRY® OS, or the like.

In some non-limiting embodiments or aspects, the system 100 may implement a web browser (not shown in the figures) stored program component. The web browser (not shown in the figures) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc.

Furthermore, one or more computer-readable storage media may be utilized in implementing embodiments consistent with the present disclosure. In some embodiments, a computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Figure 2A:
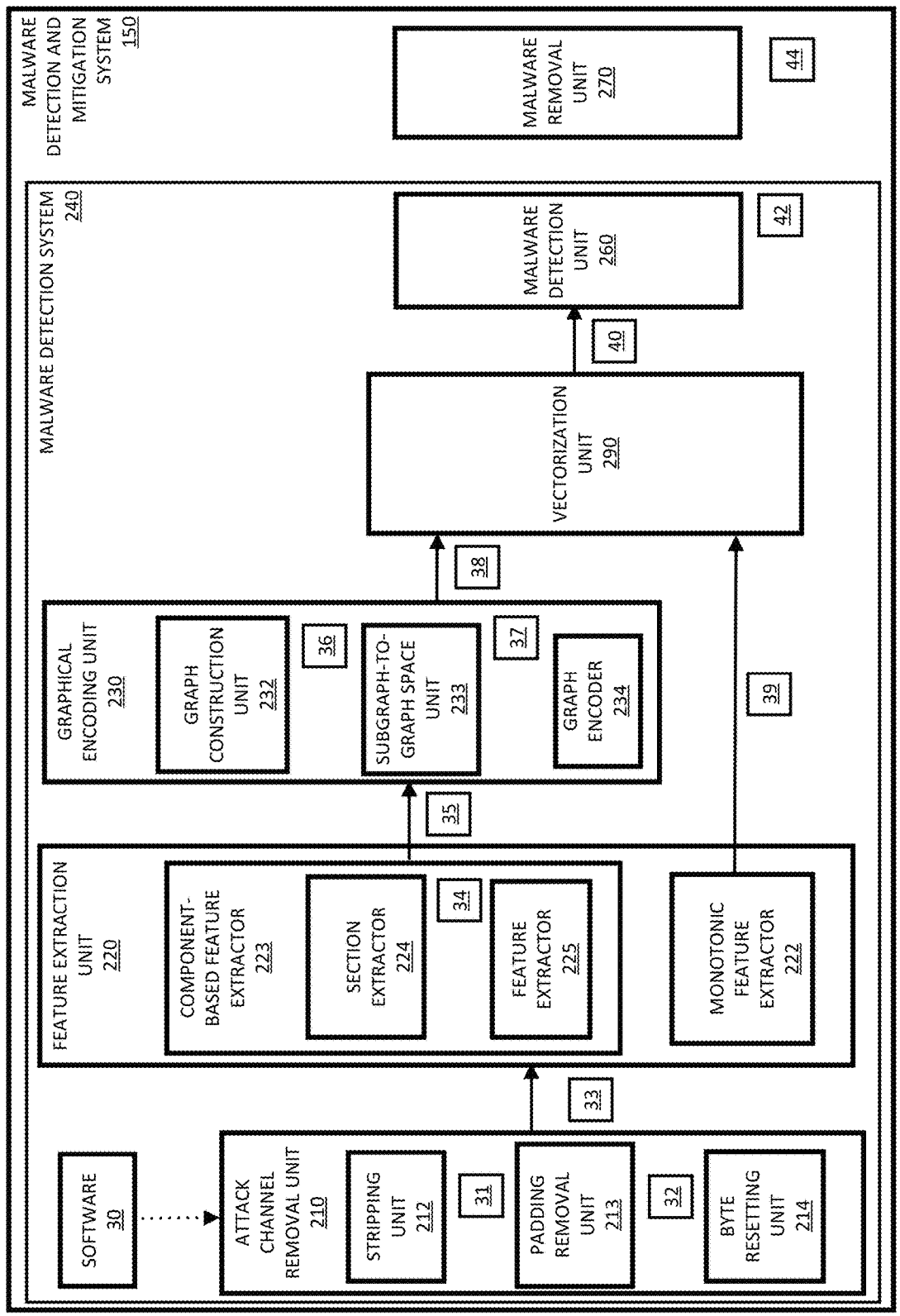
FIG. 2A illustrates a block diagram of a malware detection and mitigation system of FIG. 1 in accordance with some embodiments.

FIG. 2A illustrates a malware detection and mitigation system 150 in accordance with some embodiments. In some embodiments, the malware detection and mitigation system 150 includes a malware detection system 240 and a malware removal unit 270. In some embodiments, the malware detection system 240 includes an attack channel removal unit 210, a feature extraction unit 220, a graphical encoding unit 230, a vectorization unit 290, and a malware detection unit 260. In some embodiments, attack channel removal unit 210, feature extraction unit 220, graphical encoding unit 230, vectorization unit 290, malware detection unit 260, and malware removal unit 270 are software components collectively configured to detect and remove malware from software 30 input into malware detection system 240 of system 100.

In some embodiments, as illustrated in FIG. 2A, attack channel removal unit 210 includes a stripping unit 212, a padding removal unit 213, and a byte resetting unit 214. In some embodiments, the feature extraction unit 220 includes a monotonic feature extractor 222 and a component-based feature extractor 223. In some embodiments, the component-based feature extractor 223 includes a section extractor 224 and a feature extractor 225. In some embodiments, graphical encoding unit 230 includes a graph construction unit 232, a subgraph-to-graph space unit 233, and a graph encoder 234. In some embodiments, the feature extraction unit 220 is coupled to the attack channel removal unit 210 and the graphical encoding unit 230. In some embodiments, the vectorization unit 290 is coupled to the graphical encoding unit 230 and the malware detection unit 260.

In some embodiments, in operation, the attack channel removal unit 210 of malware detection system 240 receives software 30 from, for example, processors 102 or an external network and commences the process of removing attack channels from software 30. In some embodiments, an attack channel is a channel in software 30 that is used by adversaries to attack system 100 using mutating malware that utilizes binary level adversarial attacks. In some embodiments, a binary level adversarial attack is an attack that occurs when an adversary applies a perturbation to binary sequences of a software file utilized in system 100. In some embodiments, a perturbation may be, for example, either a modification of the values of existing bytes in the file or an addition of new byte sequences to the file. In some embodiments, the types of binary level adversarial attacks mitigated by removing the attack channels include, for example, a header information manipulation attack, a binary padding attack, an intersection injection attack, an unreachable section injection attack, and an executable section injection attack. In some embodiments, each of the aforementioned binary level adversarial attacks are mitigated using malware detection and mitigation system 150 described herein.

In some embodiments, the header information manipulation attack is an adversarial attack in which an adversary modifies arbitrary values within a program header or DOS header of a file in an attempt to cause misclassification by the malware detection system 240. In some embodiments, the binary padding attack is an adversarial attack in which an adversary appends additional binaries to the end of binaries in a software file to cause a misclassification by the binary-based classifiers. In some embodiments, the intersection injection attack is an adversarial attack that manipulates "unused" or "unmapped" bytes of the program to cause misclassification. In some embodiments, the unreachable section injection attack is an adversarial attack in which an adversary introduces a new section to the file that is mapped in the header of the file and unreachable from the original execution flow that causes misclassification. In some embodiments, the executable section injection attack is an adversarial attack where the adversary adds a new .text section that is reachable from the original program execution control and new functionalities and behavior are added to preserve the malicious functionality of the malware.

In some embodiments, in order to mitigate the binary level adversarial attacks, attack channel removal unit 210 is configured to remove the attack channels from software 30 by preprocessing the software 30 using stripping unit 212, padding removal unit 213, and byte resetting unit 214. In some embodiments, stripping unit 212 of attack channel removal unit 210 receives software 30 and removes "strippable information" from the software 30. In some embodiments, the strippable information is debugging information and header information that is categorized by attack channel removal unit 210 as being "trivial" in software 30. In some embodiments, the strippable information includes executable binaries of software 30 that are not essential or required for normal and correct execution of software 30. In some embodiments, the strippable information is considered an attack channel because it is fertile ground for adversary exploitation and malware utilization. In some embodiments, the output of stripping unit 212 is stripped software 31 that is provided to padding removal unit 213.

In some embodiments, padding removal unit 213 receives the stripped software 31 from stripping unit 212 and commences the process of removing padding from stripped software 31. In some embodiments, "padding" may be considered unmapped binaries in software 30 that, due to the virtual to physical memory mapping and paging utilized in system 100, contribute minimally to the functionality of software 30. In some embodiments, the unmapped binaries or bytes are referred to as overlay and occur at the end of software 30 (e.g., not in the header information of the software 30 and not mapped to software 30). In some embodiments, padding removal unit 213 is software configured to remove the excessive unmapped binaries from stripped software 30. In some embodiments, padding removal unit 213 may remove the padding by obtaining information regarding a boundary of a section of the software 30 and a size (or virtual size) of the section such that such information may be effectively utilized to omit the padded unmapped binaries from the end of software 30. Thus, in some embodiments, the input to padding removal unit 213 is stripped software 31 (software with overlay), and the output is padding removed software 32 (software without overlay) that is provided to byte resetting unit 214.

In some embodiments, byte resetting unit 214 receives the padding removed software 32 from padding removal unit 213 and commences the process of resetting bytes in the padding removed software 32. In some embodiments, byte resetting unit 214 is software configured to reset unmapped bytes in the received software (e.g., padding removed software 32) to prevent adversaries from utilizing the unmapped bytes for the binary level adversarial attacks. In some embodiments, in the software 30 provided to malware detection system 240, an unmapped byte area exists between the mapped sections of the software 30 that is primarily caused by the memory paging system and the difference between virtual size and raw size of the mapped sections. As stated previously, the unmapped byte area is typically exploited by adversaries by modifying the byte sequences to cause misclassification, e.g., by generating code caves and various malware mutations.

In some embodiments, byte resetting unit 214 resets the unmapped bytes to a predefined value or op-code, such as, for example, 0x00. In some embodiments, resetting the unmapped bytes to the pre-defined op-code (e.g., 0x00), reduces the possibility of an adversary conducting adversarial attacks using the unmapped bytes. In some embodiments, by resetting the value of the unmapped bytes to a predefined value, byte resetting unit 214 mitigates the effects of intersection injection attacks on the attack channel. In some embodiments, the input to byte resetting unit 214 is the padding removed software 32 with unmapped bytes randomly initialized, and the output is byte reset software 33 with unmapped bytes reset. In some embodiments, the byte resetting unit 214 provides the byte reset software 33 to feature extraction unit 220 for feature extraction processing.

In some embodiments, by removing the attack channels, attack channel removal unit 210 is improves upon existing malware detection systems by effectively mitigating binary level adversarial attacks in software 30 that inject redundant and non-functional code that allows malware to mutate and bypass typical malware detection systems.

In some embodiments, feature extraction unit 220 receives the byte reset software 33 from byte resetting unit 214 and commences the process of using component-based feature extractor 223 and monotonic feature extractor 222 to extract malware detection features from the byte reset software 33. In some embodiments, the malware detection features are component-based features and monotonic features that are used by system 100 to detect and mitigate malware in software 30 input into system 100. In some embodiments, the component-based features are features specific to independent components of byte reset software 33, i.e., software sections of the received byte reset software 33. In some embodiments, monotonic features are features in the byte reset software 33 that are monotonically increasing and cannot be arbitrarily modified by the system 100. In some embodiments, component-based feature extractor 223 is software configured to extract the component-based features from byte reset software 33. In some embodiments, monotonic feature extractor 222 is software configured to extract the monotonic features from byte reset software 33.

Figure 2B:
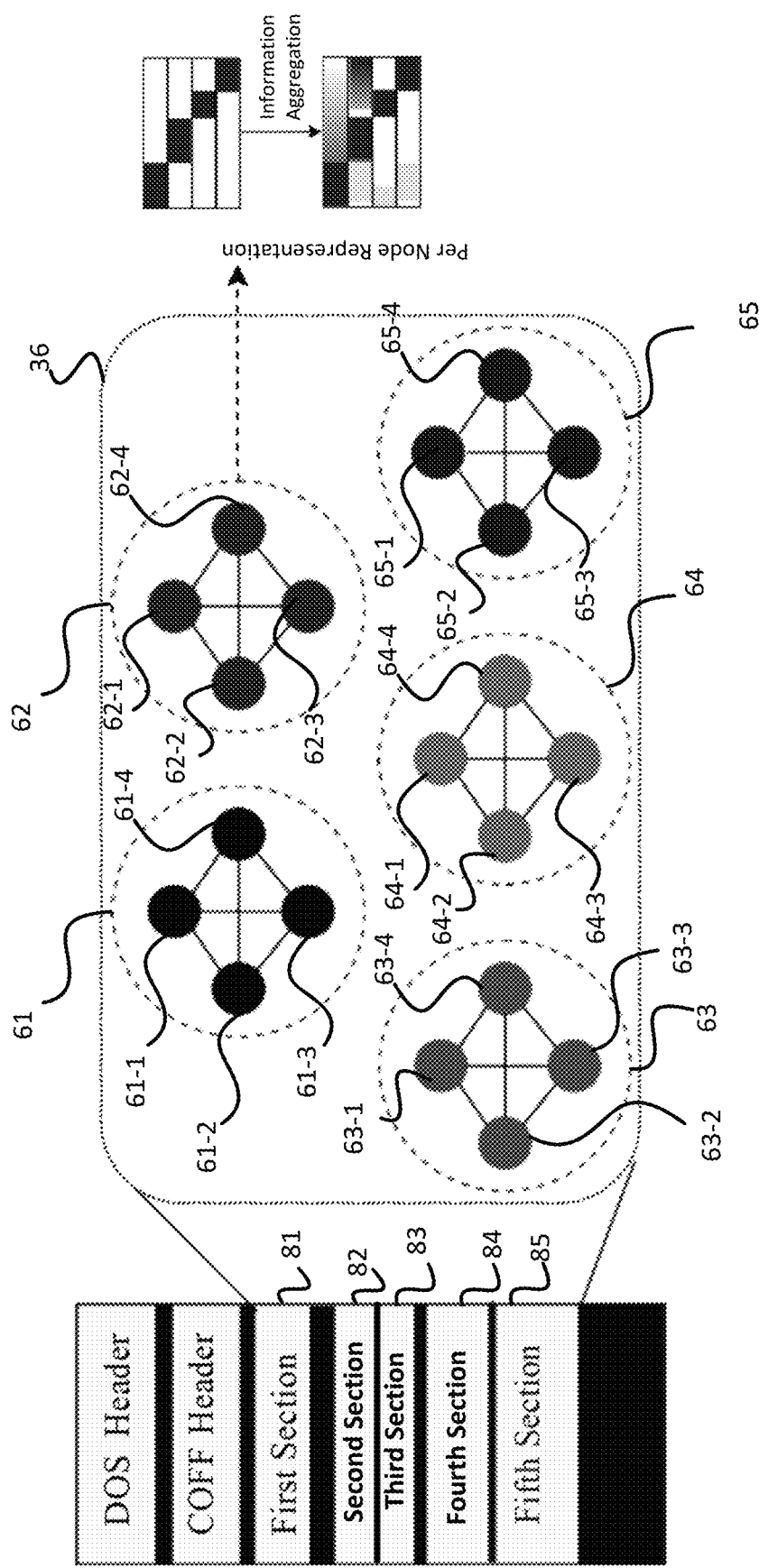
FIG. 2B illustrates a block diagram of a component-based graph representation used in the malware detection and mitigation system of FIG. 1 in accordance with some embodiments.

In some embodiments, in order to extract the component-based features from the byte reset software 33, section extractor 224 of component-based feature extractor 223 receives the byte reset software 33 and commences the process of partitioning the byte reset software 33 into distinct sections or components. In some embodiments, section extractor 224 is configured to partition byte reset software 33 into the distinct plurality of sections such that each section is independent from another section and may be represented using a plurality of component-based feature representations (described further below with reference to feature extractor 225). In some embodiments, by partitioning byte reset software 33 into distinct sections, mutations of the component-based features in a first section or component do not change the value of components-based features in another section or component. In some embodiments, section extractor 224 utilizes a natural partition method to partition the byte reset software 33 into the plurality of sections, with each section having the set of local component-based features. An example of distinct sections (e.g., 81-82) partitioned by section extractor 224 is illustrated in FIG. 2B. In some embodiments, each section is provided by section extractor 224 to feature extractor 225 for component-based feature extraction.

In some embodiments, feature extractor 225 receives each section of sections 34 from section extractor 224 and commences the process of extracting component-based features 35 from each section. In some embodiments, feature extractor 225 is configured to extract features from each section of sections 34 by scanning the sections for component-based features 35. As stated previously, component-based features are features specific to the independent components or sections of byte reset software 33 that may be used to detect malware in system 100. In some embodiments, the component-based features 35 extracted by feature extractor 225 include, for example, a bytes n-gram component-based feature, a bytes histogram component-based feature, a locality sensitive hashing component-based feature, and a string component-based feature. In some embodiments, each of the component-based features may be used to detect mutating malware in software 30 and are described further below.

In some embodiments, the bytes n-gram component-based feature is a feature representation that transforms the bytes sequences into the natural language processing domain. For example, considering that a byte (value from 0x00 to 0xFF) in software 30 may be represented as a word in a long paragraph, the bytes n-grams may be found with, for example, sizes 2-5, among the malware samples in a training dataset. In some embodiments, the extracted n-grams may be subsequently represented as a sparse n-gram counts vector by system 100.

In some embodiments, the bytes histogram component-based feature is a byte histogram representation that contains a specified number of integer values (e.g., 256) representing the counts of each byte value within the component. In some embodiments, the locality sensitive hashing component-based feature is a locality sensitive hashing that refers to a family of functions that hash similar components that are located in proximity to each other (e.g., similar hashes with partially different sequences). In some embodiments, two hashing techniques may be used, for example, an SSDeep hashing technique and a SDHash technique. In some embodiments, the hashes generated using the hashing techniques may be byte words, and natural language processing techniques may be used to embed the byte words into a vector representation for a specific learning task.

In some embodiments, strings component-based feature is a sequence of characters in a designated range of characters (e.g., five or more characters in the range of 0x20 to 0x7f) that are considered printable strings. In some embodiments, a count vectorizer may be used to represent the printable strings of the sections 34. In some embodiments, for robust malware detection, the component-based features 35 extracted by feature extractor 225 are locally computed features that correspond to a non-shared fixed location in the feature space. For instance, let X be a software, X' be the same software after binary-level mutation (P), and f(.) is the feature representation of the software. In some embodiments, robust component-based feature representation holds under the following: X'=XPf(X')=f(X)f(P). In this representation of the component-based features 35, binary-level mutations only perturb a part of the feature vector, leaving the already existing patterns intact. In some embodiments, the component-based features 35 generated by the feature extractor 225 are provided to graphical encoding unit 230.

In some embodiments, after component-based feature extractor 223 generates the component-based features 35, graph construction unit 232 of graphical encoding unit 230 receives the component-based features 35 and commences the process of graphically encoding the component-based features 35. In some embodiments, graph construction unit 232 is configured to construct a graph 36 that represents the component-based features 35 of the input software 30 (as illustrated in FIG. 2B). In some embodiments, the graph 36 generated by the graph construction unit 232 is a graph that includes a plurality of isolated subgraphs (e.g., subgraph 61, subgraph 62, subgraph 63, subgraph 64, subgraph 65 of FIG. 2B), with each subgraph 61-65 representing a component in the software 30 and each feature representation of the component (e.g., component-based feature) is a node in the subgraph. In some embodiments, the different nodes that represent a single component are fully connected, with no connection between nodes of different components or sections, as illustrated in the subgraphs 61-65 of FIG. 2B. In some embodiments, graph construction unit 232 is configured to build the fully connected subgraphs using the component-based features 35 of each section and provide the graph 36 to subgraph-to-graph space unit 233.

In some embodiments, subgraph-to-graph space unit 233 receives the graph 36 and adds the generated subgraphs (e.g., subgraphs 61-65) to a graph space. In some embodiments, after generating the graph space subgraphs 37, subgraph-to-graph space unit 233 provides the graph space subgraphs 37 to graph encoder 234. In some embodiments, graph encoder 234 receives the graph space subgraphs 37 from subgraph-to-graph space unit 233 and leverages a graph attention network to encode the graph space subgraphs 37 by aggregating information between nodes of the same section or component (as illustrated in FIG. 2B). In some embodiments, the graph attention network is an attention network configured to aggregate the information between the nodes (as illustrated in FIG. 2B) by, for example, operating on the graph-structured data and leveraging masked self-attentional layers in the graph 36 to address shortcomings of prior methods based on graph convolutions or approximations. In some embodiments, the graph attention network is trained on a malware detection task with non-negativity constraints and updates the feature representations of each node with information from other representations of the same component. In some embodiments, graph encoder 234 uses the graph attention network to encode the nodes representing different representations of the components and translate the graph into a vector representation. In some embodiments, the graph encoder 234 provides the encoded graph (e.g., graphically-encoded component-based features) as graphical encoding output 38 to vectorization unit 290.

In some embodiments, in addition to component-based feature extractor 223 of feature extraction unit 220 extracting features from byte reset software 33, monotonic feature extractor 222 of feature extraction unit 220 extracts monotonic features 39 from byte reset software 33. In some embodiments, monotonic features 39 are features in the software (e.g., byte reset software 33) that are monotonically increasing and cannot be arbitrarily modified. In some embodiments, it is the addition of information to software 30 that leads to the values of the features increasing. In some embodiments, monotonic feature extractor 222 is configured to extract four different monotonically increasing features from byte reset software 33, which include, for example, a bytes histogram monotonic feature, software imports monotonic feature, software exports monotonic feature, and a software strings monotonic feature.

In some embodiments, the bytes histogram monotonic feature is a histogram similar to the aforementioned bytes histogram feature representation, except that the histogram monotonic feature is calculated by the monotonic feature extractor 222 at the software level, e.g., using byte reset software 33 instead of sections 34. In some embodiments, the software imports monotonic feature is an import address table that is parsed to extract imported functions and libraries with the unique functions and libraries being represented using a count vectorizer. In some embodiments, the software exports monotonic feature is similar to the software imports monotonic feature, except that the exported functions are represented for a specific learning task. In some embodiments, the software strings monotonic feature is similar to the strings feature representation, except that the software strings monotonic features are calculated on the software level, e.g., using byte reset software 33 instead of sections 34. In some embodiments, the monotonic features 39 extracted by monotonic feature extractor 222 are provided to vectorization unit 290.

In some embodiments, in addition to monotonic features and component-based features being utilized to detect malware in software 30, independent nonvolatile features may also be utilized by malware detection system 240 to detect malware in software 30. In some embodiments, independent nonvolatile features are features that cannot be modified arbitrarily and that cannot be changed by modifying other arbitrary features. Examples of independent nonvolatile features include software certificate information and a start location of a section. In some embodiments, feature extraction unit 220 of malware detection system 240 may be configured to generate the independent nonvolatile features and provide the independent nonvolatile features to vectorization unit 290.

In some embodiments, vectorization unit 290 receives the graphical encoding output 38 from component-based feature extractor 223 and monotonic features 39 from monotonic feature extractor 222 and commences the process of vectorizing the graphical encoding output 38 and the monotonic features 39. In some embodiments, vectorization unit 290 is configured to combine the monotonic features 39 with the graphical encoding output 38 into a vector 40. In some embodiments, vectorization unit 290 provides the vector 40 to malware detection unit 260.

In some embodiments, malware detection unit 260 receives the vector 40 from vectorization unit 290 and commences the process of using the vector 40 for malware detection. In some embodiments, malware detection unit 260 is software configured to generate a malware indicator 42 that indicates whether the received vector 40 (and thus the corresponding portion of software 30) is malicious or not malicious. In some embodiments, malware detection unit 260 may utilize a tree learning structure, such as, for example, a Light Gradient Boosting Machine (LightGBM) tree learning structure, to detect whether the received vector 40 (that includes the vector and graphical representation of the component-based features 35 and monotonic features 39) is malicious or not malicious. In some embodiments, LightGBM is a gradient boosting framework for machine learning that is used for ranking, classification and other machine learning and detection tasks. In some embodiments, malware detection unit 260 provides the malware indicator 42 to malware removal unit 270 for removal or nullification of the detected malware.

In some embodiments, malware removal unit 270 receives the malware indicator 42 and, when the malware indicator 42 indicates that the software is malicious, removes or nullifies the malicious software. In some embodiments, when the malware indicator 42 indicates that the software is not malicious, the non-malicious software is not removed or nullified.

FIG. 2B illustrates a component-based graph representation 200 in accordance with some embodiments. In some embodiments, the component-based graph representation 200 includes sections 34, graph 36, and graphical encoding output 38 generated by malware detection system 240 of FIG. 2A. In some embodiments, in the component-based graph representation 200, the different sections 34 (e.g., section 81, section 82, section 83, section 84, and section 85) of the software 30 generated by malware detection system 240 are represented as isolated subgraphs 61-65 in the feature space. In some embodiments, each subgraph of subgraphs 61-65 includes several nodes (e.g., nodes 61-1-61-4, nodes 62-1-62-4, nodes 63-1-63-4, nodes 64-1-64-4, and nodes 65-1-65-4) each of which represents a section in different aspects (e.g., bytes histogram, imports and function calls, or strings, etc.). In some embodiments, leveraging the graph attention network techniques of malware detection system 240, the information that is represented using the nodes in the subgraphs is aggregated between the nodes of the same section or subgraph, resulting in the graphically encoded component-based features used for malware detection by malware detection and mitigation system 150.

Figure 3:
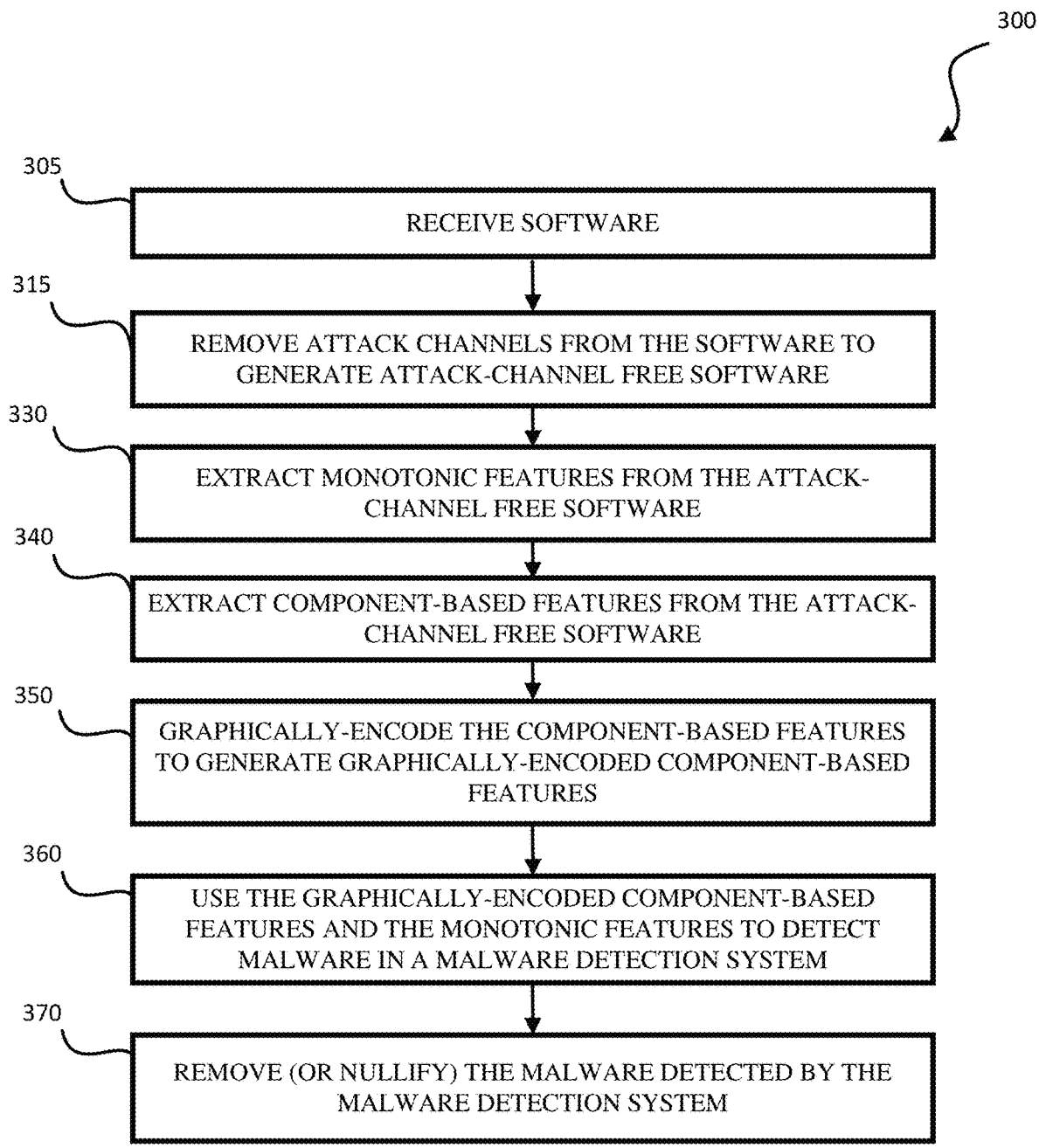
FIG. 3 is a flow diagram illustrating a method of performing malware detection and mitigation using the malware detection and mitigation system of FIG. 1 in accordance with some embodiments.

FIG. 3 illustrates a method 300 for detecting malware in software in accordance with some embodiments. The method, process steps, or stages illustrated in FIG. 3 may be implemented as an independent routine or process, or as part of a larger routine or process. Note that each process step or stage depicted may be implemented as an apparatus that includes a processor executing a set of instructions, a method, or a system, among other embodiments. In some embodiments, the method 300 is described with reference to FIG. 1-FIG. 4.

In some embodiments, with reference to FIGS. 1-3, at block 305, software is received by the malware detection system 240. In some embodiments, at block 315, attack channels are removed from the software to generate attack channel free software. In some embodiments, at block 330, monotonic features are extracted from the attack channel free software. In some embodiments, at block 340, component-based features are extracted from the attack channel free software. In some embodiments, at block 350, the component-based features are graphically encoded to generate graphically-encoded component-based features. In some embodiments, at block 360, the graphically-encoded component-based features and the monotonic features are utilized to detect malware in the software provided to the malware detection system 240. In some embodiments, at block 370, malware removal unit 270 removes or nullifies the effects of the malware detected using the malware detection system 240.

Figure 4:
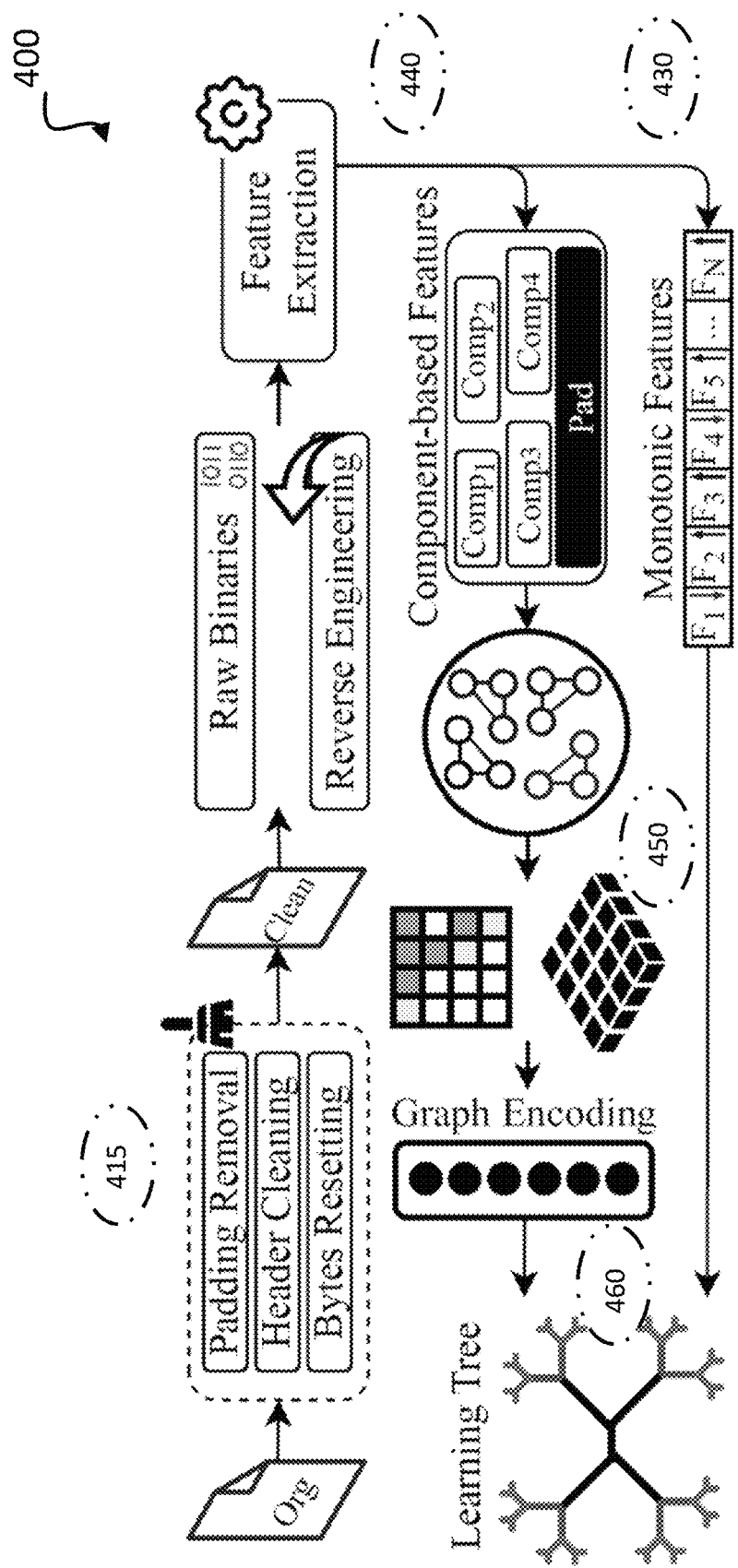
FIG. 4 is a flow and block diagram illustrating a method and system for performing the malware detection and mitigation of FIG. 3 in accordance with some embodiments.

FIG. 4 further illustrates the method 300 of FIG. 3 in accordance with some embodiments. In some embodiments, each step in FIG. 4 corresponds to a corresponding block in FIG. 3. Thus, at step 415 (corresponding to block 315 of FIG. 3), attack channels are removed (e.g., padding removal, header cleaning, and bytes resetting) from the software to generate attack channel free software. In some embodiments, at step 430 (corresponding to block 330), monotonic features (e.g., F1, F2, F3, F4, F5 . . . FN, where N is an integer) are extracted from the attack channel free software. In some embodiments, at step 440 (corresponding to block 340), component-based features (e.g., Comp1, Comp2, Comp3, Comp3) are extracted from the attack channel free software. In some embodiments, at step 450 (corresponding to block 350), the component-based features are graphically encoded to generate graphically-encoded component-based features. In some embodiments, at step 460 (corresponding to block 360), the graphically-encoded component-based features and the monotonic features are utilized to detect malware in the software provided to the malware detection system 240.

In some embodiments, a computer-implemented method, includes removing attack channels from software to generate attack-channel-free software; extracting component-based features from the attack-channel free software; extracting monotonic features from the attack-channel free software; graphically encoding the component-based features to generate graphically-encoded component-based features; and using the graphically-encoded component-based features and the monotonic features to detect malware in a malware detection system.

In some embodiments of the computer-implemented, removing the attack channels includes removing padding from the software, stripping unnecessary data from the software, and resetting bytes in the software.

In some embodiments of the computer-implemented, the monotonic features that are extracted from the attack-channel free software are features that are monotonically increasing.

In some embodiments of the computer-implemented, in order to extract the component-based features, the attack-channel free software is partitioned into a plurality of sections.

In some embodiments of the computer-implemented, the component-based features extracted from the attack-channel free software are features that are local to a section of the plurality of sections of the attack-free channel free software.

In some embodiments of the computer-implemented, the component-based features are graphically encoded using a graph attention network.

In some embodiments of the computer-implemented, in order to use the graph attention network, a graph is constructed of the plurality of sections.

In some embodiments of the computer-implemented, the graph that is constructed includes a plurality of subgraphs, each subgraph of the plurality of subgraphs representing a component in the software.

In some embodiments of the computer-implemented, a feature representation of the component is represented by a node in a subgraph of the plurality of subgraphs.

In some embodiments of the computer-implemented, the feature representation of the node is updated with information from a feature representation associated with another node of the component.

In some embodiments of the computer-implemented, the nodes of each subgraph of the plurality of subgraphs are encoded to generate the graphically-encoded component-based features.

In some embodiments of the computer-implemented, the nodes of the subgraphs that have been encoded are used for malware detection.

In some embodiments of the computer-implemented, the monotonic features extracted from the attack-channel free software and the graphically-encoded component-based features are combined to generate a combination monotonic-component based feature vector.

In some embodiments of the computer-implemented, the combination monotonic-component based feature vector is used to determine whether the software is malicious or not malicious.

In some embodiments, a system includes a processor; and a non-transitory computer readable medium coupled to the processor, the non-transitory computer readable medium comprising code, that when executed by the processor, causes the processor to: remove attack channels from software to generate attack-channel free software; extract component-based features and monotonic features from the attack-channel free software; graphically encode the component-based features to generate graphically-encoded component-based features; and utilize the graphically-encoded component-based features and the monotonic features to determine whether the software is malware.

In some embodiments of the system, the monotonic features that are extracted from the attack-channel free software are features that are monotonically increasing.

In some embodiments of the system, in order to extract the component-based features, the attack-channel free software is partitioned into a plurality of sections.

In some embodiments of the system, the component-based features extracted from the attack-channel free software are features that are local to a section of the plurality of sections of the attack-free channel free software.

In some embodiments, a malware detection system includes an attack channel removal unit; a feature extraction unit coupled to the attack channel removal unit; and a graphical encoding unit coupled to the feature extraction unit and a malware detection unit, wherein, based upon graphically-encoded component-based features and monotonic features extracted from attack-channel-free software output by the attack channel removal unit, the malware detection unit detects malware in software input into the malware detection system.

In some embodiments of the malware detection system, the monotonic features extracted from the attack-channel free software and the graphically-encoded component-based features are combined to generate a combination monotonic-component based feature vector, the combination monotonic-component based feature vector being used to detect malware using the malware detection system.

In some embodiments, utilizing the malware detection and mitigation system described herein significantly improves upon existing malware detection systems by, for example, effectively mitigating binary level adversarial attacks in software that inject redundant and non-functional code that allows malware to mutate and bypass typical malware detection systems. In some embodiments, the detailed technology provided in the malware detection and mitigation system described herein improves upon the functionality of computer devices by, for example, mitigating the effects of mutating malware in the computer devices.

What is claimed is:

1. A computer-implemented method, comprising:
    removing attack channels from software to generate attack-channel-free software, the attack-channel-free software including byte reset software;
    extracting component-based features from the attack-channel free software, the component-based features being specific to independent components of the byte reset software, the byte reset software being software with unmapped bytes reset, the reset unmapped bytes in the byte reset software being configured to reduce adversarial attacks;
    extracting monotonic features from the attack-channel free software, the monotonic features being features in the byte reset software;
    graphically encoding the component-based features to generate graphically-encoded component-based features, wherein the component-based features are graphically encoded using a graph attention network; and
    using the graphically-encoded component-based features and the monotonic features to detect malware in a malware detection system.

2. The computer-implemented method of claim 1, wherein:
    removing the attack channels includes removing padding from the software, stripping unnecessary data from the software, and resetting bytes in the software.

3. The computer-implemented method of claim 2, wherein:
    the monotonic features that are extracted from the attack-channel free software are features that are monotonically increasing.

4. The computer-implemented method of claim 3, wherein:
    in order to extract the component-based features, the attack-channel free software is partitioned into a plurality of sections.

5. The computer-implemented method of claim 4, wherein:
    the component-based features extracted from the attack-channel free software are features that are local to a section of the plurality of sections of the attack-free channel free software.

6. The computer-implemented method of claim 5, wherein:
    in order to use the graph attention network, a graph is constructed of the plurality of sections.

7. The computer-implemented method of claim 6, wherein:
    the graph that is constructed includes a plurality of subgraphs, each subgraph of the plurality of subgraphs representing a component in the software.

8. The computer-implemented method of claim 7, wherein:
    a feature representation of the component is represented by a node in a subgraph of the plurality of subgraphs.

9. The computer-implemented method of claim 8, wherein:

the feature representation of the node is updated with information from a feature representation associated with another node of the component.

10. The computer-implemented method of claim 9, wherein:
the nodes of each subgraph of the plurality of subgraphs are encoded to generate the graphically-encoded component-based features.

11. The computer-implemented method of claim 10, wherein:
the nodes of the subgraphs that have been encoded are used for malware detection.

12. The computer-implemented method of claim 11, wherein:
the monotonic features extracted from the attack-channel free software and the graphically-encoded component-based features are combined to generate a combination monotonic-component based feature vector.

13. The computer-implemented method of claim 12, wherein:
the combination monotonic-component based feature vector is used to determine whether the software is malicious or not malicious.

14. A system, comprising:
a processor; and
a non-transitory computer readable medium coupled to the processor, the non-transitory computer readable medium comprising code, that when executed by the processor, causes the processor to:
remove attack channels from software to generate attack-channel free software, the attack-channel-free software including byte reset software;
extract component-based features and monotonic features from the attack-channel free software, the component-based features being specific to independent components of the byte reset software and the monotonic features being features in the byte reset software, the byte reset software being software with unmapped bytes reset, the reset unmapped bytes of the byte resets software being configured to reduce adversarial attacks;
graphically encode the component-based features to generate graphically-encoded component-based features; and
utilize the graphically-encoded component-based features and the monotonic features to determine whether the software is malware.

15. The system of claim 14, wherein:
the monotonic features that are extracted from the attack-channel free software are features that are monotonically increasing.

16. The system of claim 15, wherein:
in order to extract the component-based features, the attack-channel free software is partitioned into a plurality of sections.

17. The system of claim 16, wherein:
the component-based features extracted from the attack-channel free software are features that are local to a section of the plurality of sections of the attack-free channel free software.

* * * * *